United States Patent

Nybom, deceased

[15] 3,666,655
[45] May 30, 1972

[54] DEVICE FOR HOLDING AND GUIDING A BENDABLE STRIP IN ELECTROPHORESIS

[72] Inventor: Nils Goran Nybom, deceased, Late of Kristianstad, Balsgard, Postlada 550, Sweden by Ethel Barbro Louise Nybom, administratrix

[22] Filed: Jan. 25, 1971

[21] Appl. No.: 109,516

[30] Foreign Application Priority Data

Jan. 30, 1970 Sweden...................................1208/70

[52] U.S. Cl............................................204/299, 204/180 S
[51] Int. Cl..........................................................B01k 5/00
[58] Field of Search..............................204/180 S, 180 G, 299

[56] References Cited

UNITED STATES PATENTS

| | | |
|---|---|---|
| 2,768,948 | 10/1956 | McDonald et al. .................204/180 S |
| 2,962,425 | 11/1960 | Sharpsteen, Jr. et al...................204/1 |
| 3,317,417 | 5/1967 | Raymond...............................204/299 |
| 3,396,096 | 8/1968 | Belote et al............................204/299 |
| 3,421,998 | 1/1969 | Yallen ...................................204/299 |
| 3,432,424 | 3/1969 | Zec........................................204/299 |

*Primary Examiner*—John H. Mack
*Assistant Examiner*—A. C. Prescott
*Attorney*—Pierce, Scheffler & Parker

[57] ABSTRACT

Apparatus for electrophoresis includes a trough from which electrolyte is conducted by means of a bendable porous strip dipping into the electrolyte to a plate having a layer thereon to be moistened by and brought into contact with the electrolyte. To properly bend and guide the strip between the trough and the layer to be moistened, one side of the strip is secured within a holder which rests within the trough and is provided with a curvilinear portion which engages the strip and simultaneously bends and the other side of the strip into a pressing engagement with the layer to be moistened with the electrolyte.

4 Claims, 3 Drawing Figures

Patented May 30, 1972  3,666,655

DEVICE FOR HOLDING AND GUIDING A BENDABLE STRIP IN ELECTROPHORESIS

The present invention relates to a device for holding and guiding a bendable, porous strip saturated with electrolyte, in an apparatus for electrophoresis comprising an electrolyte trough from which electrolyte by means of the strip is adapted to be conducted to a plate having a layer to be moistened by the electrolyte. By means of the strip saturated with electrolyte a good electric contact will be secured between the layer of the plate and the electrolyte trough.

The holding device according to the invention is characterized by a holding portion adapted to be dipped into the electrolyte and to wholly or partially surround the strip, and further by a guiding and pressing portion deflected relatively to said holding portion and adapted to bend the strip towards said plate and to press the strip to uniformly contact the layer to be moistened.

Preferably, the holding device is entirely made up of a wholly transparent material, for instance acrylic plastic. A suitable construction is obtained by the use of stave-shaped plates as starting material, said plates at the ends thereof being fastened together by means of suitable spacing members. One of said plates is made wider than the other one and is provided with a laterally projecting deflected portion which may serve as said guiding and pressing portion.

By means of the invention considerable advantages are obtained which more exactly appear from the following specification. Thus, for instance, the replacement of strips is made easier, as is the replacement of plates when using the same strip. At the same time a very uniform moistening is secured of the plate which should be moistened by or have a good electric contact with the electrolyte, respectively.

The invention is more exactly described below with reference to the accompanying drawings in which, by way of examples, partly a conventional electrophoresis apparatus and partly a device according to invention are shown.

Figure 1:
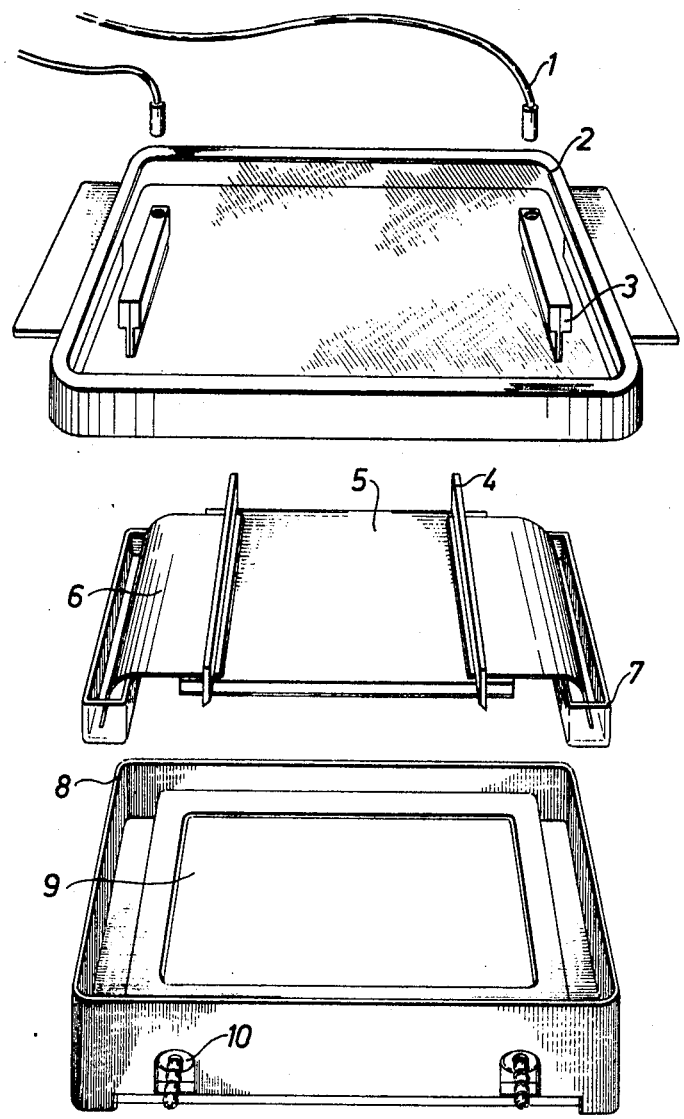
FIG. 1 shows the conventional electrophoresis apparatus with the details forming parts thereof slightly apart.

Since FIG. 1 shows a conventional apparatus it obviously will be sufficient to enumerate the details forming parts of the same. Thus, with reference numeral 1 electric conductors are designated by means of which current is supplied to the electrodes 3. Reference numeral 2 designates a cover to which the electrodes may be attached. Reference numeral 4 designates rods adapted to firmly press electrolyte conducting strips 6 against a thin layer chromatography plate 5. Reference numeral 7 designates electrolyte troughs from which the strips 6 are adapted to pick up the electrolyte. Reference numeral 8 designates a housing or box the greater portion of which is occupied by a cooling block 9. Said cooling block 9 is cooled by means of a cooling liquid which is supplied by means of cooling conduits 10.

Figure 2:
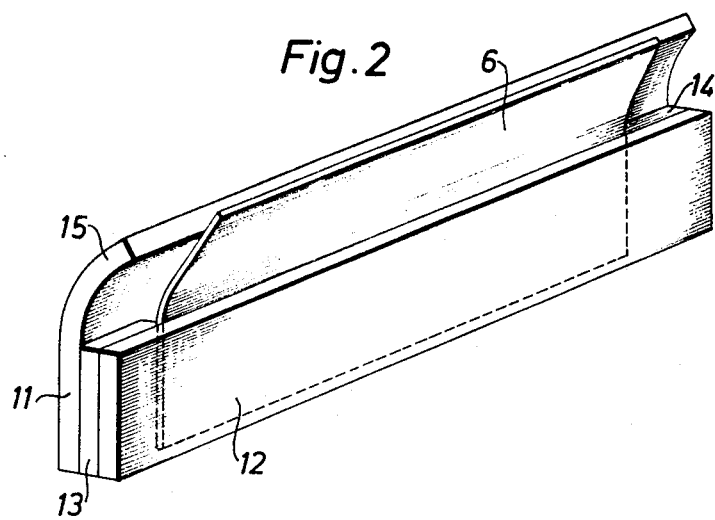
FIGS. 2 and 3 show the holding device according to the invention.
Figure 3:
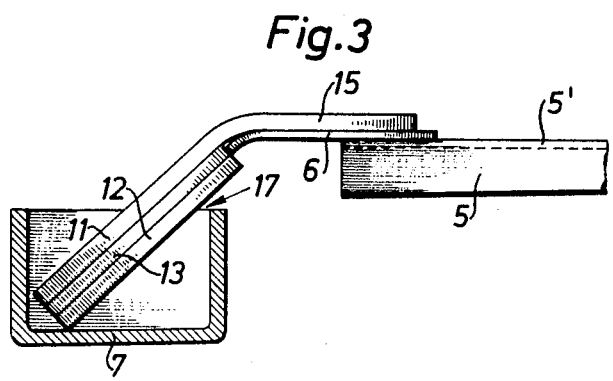

When the device according to FIG. 1 should be loaded with strips 6 it is often difficult to place the strips in desired positions. In fact, the strips are relatively stiff until they have become thoroughly soaked. Owing to this not only the contact with the chromatography plate 5 but also the dipping into the troughs 7 may not be uniform, despite the pressing rods 4. On the other hand, the strips after soaking are flabby and difficult to handle. The object of the device according to FIGS. 2 and 3 is primarily to overcome these difficulties. In the embodiment shown in the drawing the device is contemplated to wholly replace the pressing rods 4. Alternatively, however, in certain electrophoresis apparatus it is possible to keep the pressing rods in order to secure a contact along two parallel lines.

The device according to FIG. 2 may be considered as composed by two stave-shaped plates 11 and 12 which are kept apart by means of spacing members 13 and 14. The plate 11 is wider than the plate 12 and provides a laterally projecting portion 15 which is deflected so as to serve to guide the strip 6 to contact with the chromatography plate 5 and the layer 5' thereof. The deflected portion 15 has such a shape that the strip 6 has a wide contact surface on the plate 5. The described holding device is so dimensioned relatively to the trough 7 that a slot is provided at 17 between the trough 7 and the holding device 12. This secures that always substantially the same pressing force will be exerted on the plate 5. A further advantage of the device according to the invention, besides the fact that it facilitates as well the replacement of strips as also particularly the replacement of plates, is that the device counteracts evaporation from the moistened strip. In fact, unlike the plate, said strip is not so very easy to cool. When it becomes warm and gets dry an undesired potential fall arises through the strip causing an impaired transport of the electrolyte and a poor electric contact and unreproduceable results.

The invention of course is not restricted to the example described above only. The holding device according to the invention may for instance be used in connection with many other similar constructions of other makes than that shown in FIG. 1. Furthermore, the holding device of course may be made of various materials having slightly different shape as compared with the embodiment shown in the drawing.

What is claimed is:

1. In apparatus for electrophoresis having a device for holding and guiding a bendable, porous strip for conducting an electrolyte to a plate having a layer to be moistened thereby comprising, a longitudinal trough for a supply of electrolyte, a porous strip, means at least partially surrounding a lateral transverse edge portion of said strip for holding said strip and adapted to be immersed in the electrolyte in said trough, said means including a projecting portion extending along and contacting said strip in the transverse direction thereof, said projecting portion being deflected along its outer edge portion inwardly with respect to said holding means, whereby said porous strip is bent toward the plate and is uniformly pressed in contact with the layer on the plate.

2. In apparatus having a device as claimed in claim 1 wherein said holding means comprises two longitudinal plates engaging opposite sides of said strip adjacent one end thereof and spacing members between said two plates at the outer edges of said strip.

3. In apparatus having a device as claimed in claim 2 wherein the outer of said two longitudinal plates is wider than the inner of said plates to provide the projecting portion.

4. In apparatus having a device as claimed in claim 1 wherein the deflected projecting portion of said holding means contacts said strip along a substantial lateral portion thereof.

* * * * *

UNITED STATES PATENT OFFICE
CERTIFICATE OF CORRECTION

Patent No. 3,666,655          Dated  May 30, 1972

Inventor(s)   NILS GORAN NYBOM (Deceased)

It is certified that error appears in the above-identified patent and that said Letters Patent are hereby corrected as shown below:

The name of the assignee, namely,

AB INSTRUMENTA has been omitted from the heading of the patent.

Signed and sealed this 10th day of October 1972.

(SEAL)
Attest:

EDWARD M. FLETCHER, JR.　　　　　　ROBERT GOTTSCHALK
Attesting Officer　　　　　　　　　　Commissioner of Patents